United States Patent
Meister et al.

(10) Patent No.: US 8,205,249 B2
(45) Date of Patent: Jun. 19, 2012

(54) METHOD FOR CARRYING OUT A SECURE ELECTRONIC TRANSACTION USING A PORTABLE DATA SUPPORT

(75) Inventors: Gisela Meister, München (DE); Nigol Martin, München (DE)

(73) Assignee: Giesecke & Devrient GmbH, Munich (DE)

( * ) Notice: Subject to any disclaimer, the term of this patent is extended or adjusted under 35 U.S.C. 154(b) by 780 days.

(21) Appl. No.: 10/531,259

(22) PCT Filed: Oct. 23, 2003

(86) PCT No.: PCT/EP03/11761
§ 371 (c)(1),
(2), (4) Date: Apr. 24, 2006

(87) PCT Pub. No.: WO2004/038665
PCT Pub. Date: May 6, 2004

(65) Prior Publication Data
US 2006/0242691 A1   Oct. 26, 2006

(30) Foreign Application Priority Data
Oct. 24, 2002   (DE) .................................. 102 49 801

(51) Int. Cl.
G06F 7/04     (2006.01)
G06F 12/00    (2006.01)
G06F 12/14    (2006.01)
G06F 21/00    (2006.01)

(52) U.S. Cl. .................. 726/9; 726/20; 705/53; 713/166
(58) Field of Classification Search ................ 726/9, 20; 705/53; 713/166
See application file for complete search history.

(56) References Cited

U.S. PATENT DOCUMENTS

| | | | |
|---|---|---|---|
| 4,993,068 A * | 2/1991 | Piosenka et al. | 713/186 |
| 6,263,447 B1 | 7/2001 | French | |
| 6,408,388 B1 | 6/2002 | Fischer | |
| 6,567,915 B1 * | 5/2003 | Guthery | 713/168 |
| 6,651,168 B1 * | 11/2003 | Kao et al. | 713/185 |
| 6,779,113 B1 * | 8/2004 | Guthery | 713/172 |

(Continued)

FOREIGN PATENT DOCUMENTS

EP   1045346 A   10/2000

(Continued)

OTHER PUBLICATIONS

Russel Davis, Network Authentication Tokens, Computer Security Applications Conference, 1989, 5th annual, Dec. 4, 1989, pp. 234-238 (ISBN: 0/8186-2006-4).

*Primary Examiner* — Nathan Flynn
*Assistant Examiner* — Trang Doan
(74) *Attorney, Agent, or Firm* — Bacon & Thomas, PLLC

(57) ABSTRACT

A method for effecting a secure electronic transaction on a terminal using a portable data carrier is proposed. According to the method a user (30) first authenticates himself vis-à-vis the portable data carrier (20). The portable data carrier (20) at the same time produces quality information about how authentication was done. The authentication is confirmed to the terminal (14). Then the portable data carrier (20) performs a security-establishing operation within the transaction, for example the creation of a digital signature. It attaches the quality information to the result of the security-establishing operation.

13 Claims, 3 Drawing Sheets

U.S. PATENT DOCUMENTS

| | | | |
|---|---|---|---|
| 6,810,479 B1* | 10/2004 | Barlow et al. | 713/185 |
| 6,915,426 B1* | 7/2005 | Carman et al. | 713/168 |
| 7,051,206 B1* | 5/2006 | Giest et al. | 713/176 |
| 7,162,058 B2* | 1/2007 | Mimura et al. | 382/124 |
| 7,286,691 B1* | 10/2007 | Modl et al. | 382/115 |
| 7,403,765 B2* | 7/2008 | Miyashita | 455/411 |
| 7,409,554 B2* | 8/2008 | Ishibashi et al. | 713/175 |
| 7,457,442 B2* | 11/2008 | Mimura et al. | 382/124 |
| 2002/0016913 A1* | 2/2002 | Wheeler et al. | 713/170 |
| 2002/0087894 A1* | 7/2002 | Foley et al. | 713/202 |
| 2002/0095587 A1* | 7/2002 | Doyle et al. | 713/186 |
| 2002/0128969 A1* | 9/2002 | Parmelee et al. | 705/42 |
| 2002/0129256 A1* | 9/2002 | Parmelee et al. | 713/180 |
| 2002/0141586 A1* | 10/2002 | Margalit et al. | 380/270 |
| 2002/0150283 A1 | 10/2002 | Mimura et al. | |
| 2003/0005310 A1* | 1/2003 | Shinzaki | 713/186 |
| 2003/0012382 A1* | 1/2003 | Ferchichi et al. | 380/270 |
| 2003/0014372 A1* | 1/2003 | Wheeler et al. | 705/71 |
| 2003/0046554 A1* | 3/2003 | Leydier et al. | 713/186 |
| 2003/0101348 A1* | 5/2003 | Russo et al. | 713/185 |
| 2003/0115142 A1* | 6/2003 | Brickell et al. | 705/51 |
| 2004/0005051 A1* | 1/2004 | Wheeler et al. | 380/28 |
| 2007/0076925 A1* | 4/2007 | Mimura et al. | 382/124 |
| 2007/0276754 A1* | 11/2007 | Parmelee et al. | 705/43 |

FOREIGN PATENT DOCUMENTS

| | | |
|---|---|---|
| JP | 11143833 A | 5/1999 |
| JP | 2001312476 | 11/2001 |
| JP | 2001344213 A | 12/2001 |
| WO | 0074001 A1 | 12/2000 |
| WO | 0182190 A | 11/2001 |
| WO | 02067091 A | 8/2002 |
| WO | 02073341 A2 | 9/2002 |

* cited by examiner

METHOD FOR CARRYING OUT A SECURE ELECTRONIC TRANSACTION USING A PORTABLE DATA SUPPORT

BACKGROUND

A. Field

This invention relates to secure authentication of a user of a portable data carrier communicating with a terminal.

This invention starts out from a method exemplified, for example, by the method according to "Handbuch der Chipkarten" (herein-after "Chip card manual"), W. Rankl, W. Effing, 3rd edition, 1999, pp. 692 to 703, under the title "Digital signature". For performing a legally binding electronic signature, a digital signature card containing a secret signature key is accordingly to be used. A signature is performed on a suitable terminal from which the card receives in electronic form a document to be signed. To be able to perform a signature, the user of the card must establish proof of his identity through the terminal. This proof is regularly furnished by entering a PIN (person identification number) which is compared with a reference PIN stored in the card. In future it is planned to perform user authentication by checking a biometric feature, e.g. a fingerprint. When an electronic document has been signed with the help of a signature card after successful authentication of the user, the document can then be passed on in any way. The electronic signature makes it possible to effect particularly security-critical transactions, e.g. the placing of service orders involving costs, by electronic channels.

The intended introduction of biometric features for user authentication obtains a further improvement of the trustworthiness of an electronic signature compared to the hitherto usual PIN authentication, because it guarantees that the signature card can only be used in the presence of a definite person entitled to do so.

However, the thereby realized quality difference with regard to user authentication is hitherto not reflected in the usability of the particular electronic signature produced.

It is the problem of the invention to specify a method for effecting a secure electronic transaction using a portable data carrier which takes account of the quality of the user authentication performed.

According to the invention, when user authentication is being performed the performing data carrier produces quality information about the authentication method used. This voucher is attached to the result of a security-establishing operation subsequently performed by the portable data carrier. The recipient of a thus formed message can therefore clearly recognize how a user has authenticated himself before effecting the security-establishing operation. This gives the recipient the possibility of making the effecting of a secure transaction contingent on the quality of user authentication. For example, in a purse application it can be provided that an amount of money below a limiting value can be withdrawn from an account after PIN authentication, while amounts of money above the limiting value can only be withdrawn after authentication by means of a biometric feature.

The inventive method is used particularly advantageously in connection with the electronic signature.

SUMMARY

In a preferred embodiment, the implementation of the various possible user authentication methods is so designed that the intermediate execution results of the lower-quality method cannot be converted in a simple way into intermediate execution results of a higher-quality method. This achieves the result that it is impossible to tamper with an authentication voucher even when an unauthorized user has access to both a portable data carrier and associated, low-order authentication information, i.e. when an unauthorized user has for example a portable data carrier together with an associated PIN.

It is further advantageous if the particular authentication methods not used in performing a user authentication are disabled for the duration of the authentication.

DESCRIPTION OF THE DRAWINGS

An embodiment of the invention will hereinafter be explained in more detail with reference to the drawing.
Drawing

FIG. 1 illustrates the basic structure of a transaction system for effecting a secure electronic transaction. Essential elements of the structure with regard to the invention are a background system 10 connected to a terminal 14 via a data network 12, a portable data carrier 20 which is carried by a user 30 and set up to perform a security-establishing operation within a transaction, and a data record 40 which is to be handled securely within a transaction to be effected.

Figure 1:
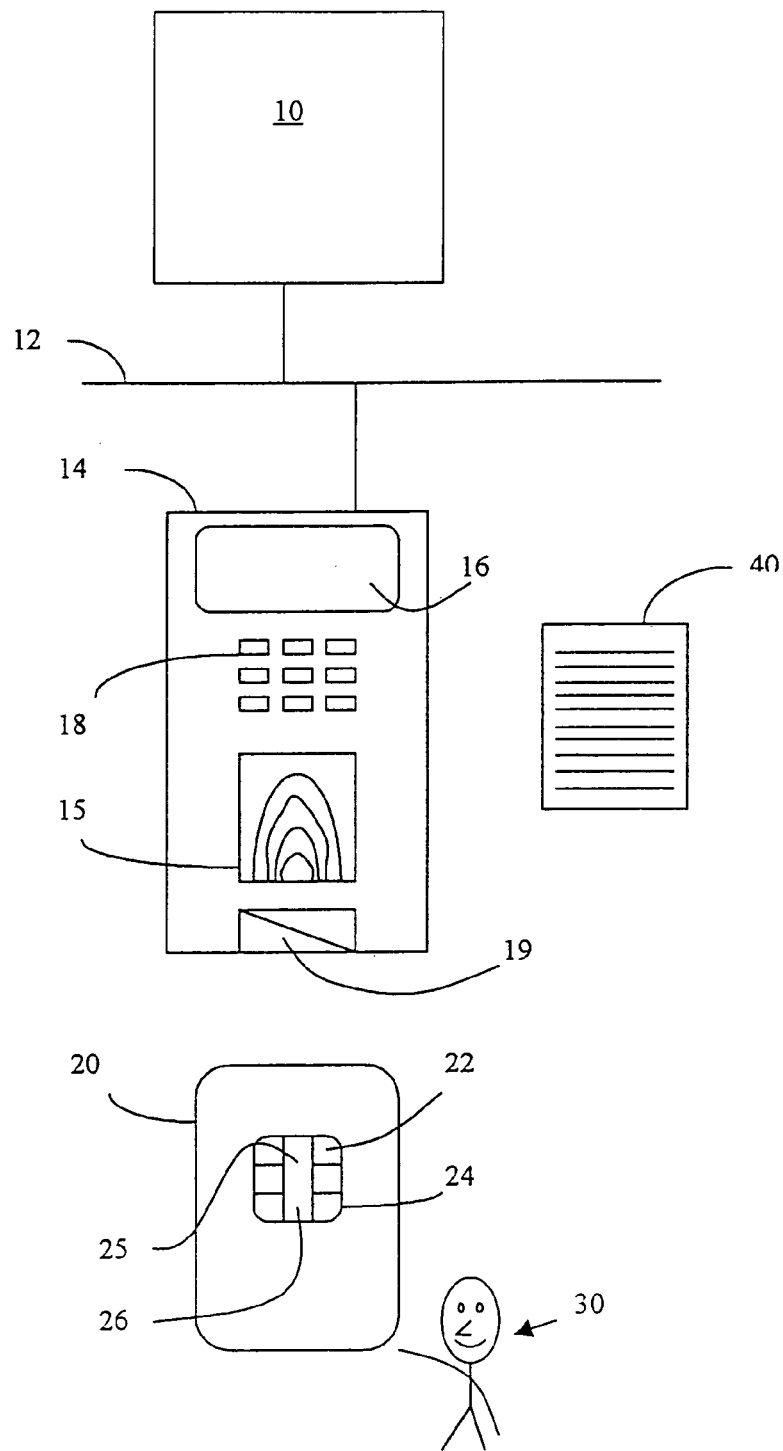
FIG. 1 shows the structure of a system for performing a digital signature.

The secure electronic transaction will hereinafter be assumed to be a transaction requiring the production of a digital signature on the part of the user 30. Such a transaction can be e.g. the effecting of a banking transaction by which the account of the user 30 is debited. However, the described solution is not restricted to transactions requiring a digital signature but is fundamentally usable in any application in which a portable data carrier 20 processes data records 40 supplied from a terminal 14 and gives back them to the terminal 14.

The background system 10 is representative of a device that effects the actual transaction, e.g. the movement of money between two accounts or the initiation of a delivery of goods following an order. The background system 10 can accordingly be a complex system comprising a plurality of individual components or, in extreme cases, be completely omitted. If the transaction is an account movement application, the background system 10 is typically formed by a central bank office.

The data network 12 serves to exchange data between a terminal 14 and the background system 10. It can have any physical form and be realized for example by the Internet or a mobile phone network.

The terminal 14 constitutes the user-side interface of the transaction system and has for this purpose display means 16, typically in the form of a display screen, and input means 18, e.g. in the form of a keyboard. The terminal 14 can be a publicly accessible terminal, e.g. a device set up in a bank, or a device situated in the private area of a user 30, e.g. a PC or mobile telephone. The data network 12, thus a background system 10, can have connected thereto one or more terminals 14 which can be of different design. The terminal 14 has an interface 19 for communication with a portable data carrier 20. The interface 19 can be of any physical design, in particular of contact-type or non-contact type.

The terminal 14 further has a sensor device 15, referred to hereinafter as the sensor, for detecting a biometric feature of a user 30. The sensor 15 can be capable of detecting physiological features, such as facial features, features of the eye or fingerprints, or behavior-based features, such as speech or writing sequences expressed by the voice or by writing operations. FIG. 1 indicates a fingerprint sensor as the sensor 15. The sensor 15 can be formed for sensing a plurality of different biometric features. The sensor 15 further contains means for pre-evaluating a sensed biometric feature. The sensed information is thereby reduced to certain, characteristic primary features. The different types and the implementation of biometric authentication methods are described for example in the abovementioned "Chip card manual", chapter 8.1.2.

The portable data carrier 20 is for example a chip card as likewise described in detail in the "Chip card manual". FIG. 1 indicates for the portable data carrier 20 in particular a contact-type chip card with a contact pad 22 constituting an interface corresponding to the terminal-side interface 19. Via the interfaces 22, 19 the communication between chip card 20 and terminal 14 is effected. Apart from the shape of a chip card, the portable data carrier 20 can have any other shapes, being realized for example in an article of clothing worn by the user 30 or an article of daily use carried by the user 30.

The portable data carrier 20 has an integrated circuit 24 which has all elements of a usual computer, in particular a microprocessor 25 and storage means 26. The microprocessor 25 is set up to perform a security-establishing operation. For example, it is set up to subject a supplied data record 40, referred to hereinafter as an electronic document 40, to a cryptographic algorithm, whereby it uses at least one secret key stored in the storage means 26. The microprocessor 25 is also set up to realize further functionalities according to programs stored in the storage means 26.

The portable data carrier 20 is further set up to perform at least one, but expediently a plurality of different quality user authentication methods. It preferably supports at least two authentication methods of different order with regard to the quality of authentication. It expediently supports at least one knowledge-based authentication method, e.g. a PIN check, and at least one biometric method, within which a biometric feature of the user 30 to be presented at the terminal 14 is checked. The biometric method inherently constitutes the higher-quality one here, since it presupposes the personal presence of the user 30; this is not ensured in the knowledge-based method since the knowledge can have been acquired by an unauthorized user. Accordingly the storage means 26 store at least one secret to be presented by the user 30, e.g. a reference PIN assigned to a user 30, and at least one biometric reference data record assigned to a user 30. It can expediently be provided that the portable data carrier 20 supports more than two authentication methods, in particular further biometric methods. Accordingly the storage means 26 in this case store further secrets and/or reference data records and the integrated circuit 24 is set up to perform the further authentication methods.

Figure 2:
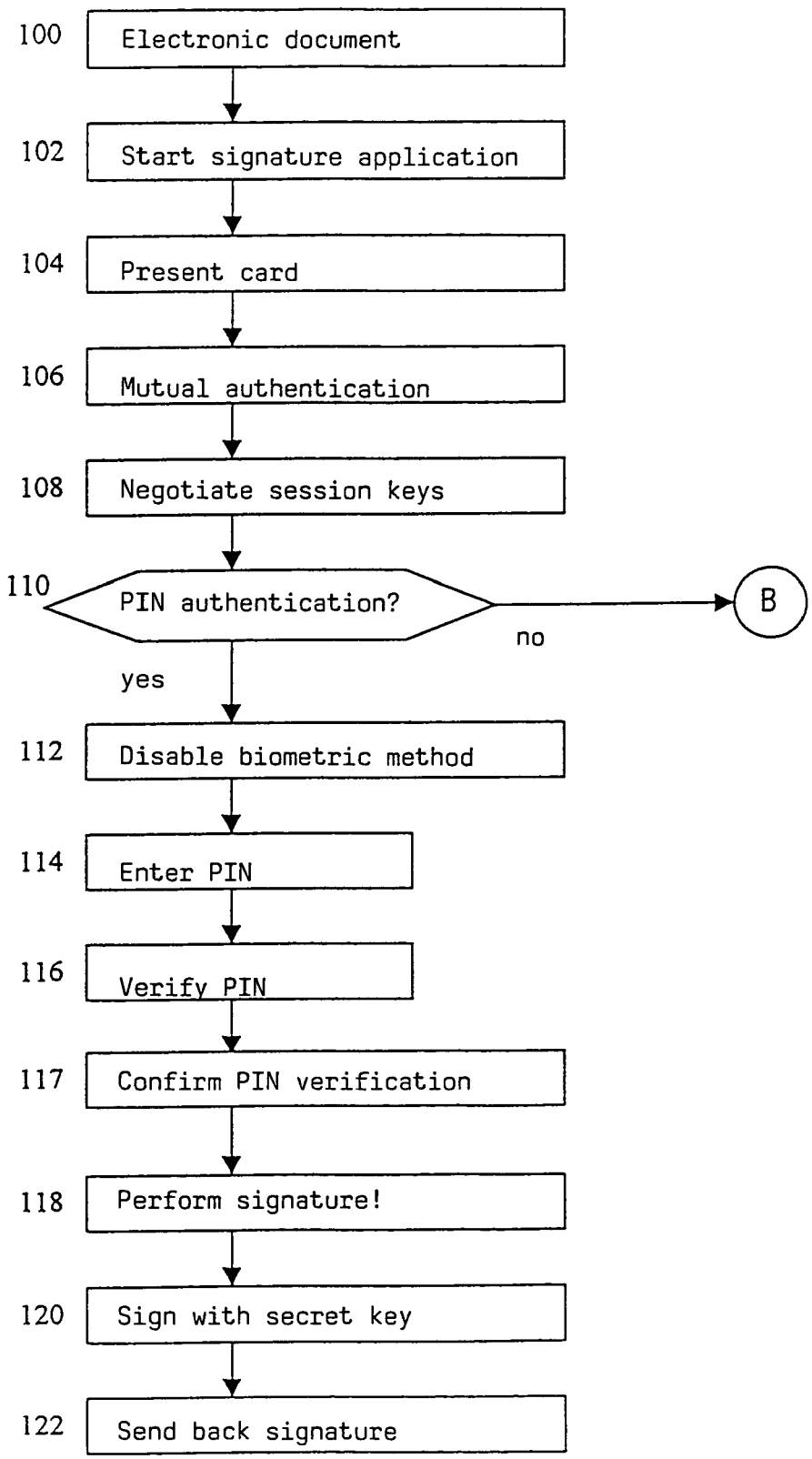
FIGS. 2, 3 show the process of performing a digital signature as a flow chart.
Figure 3:
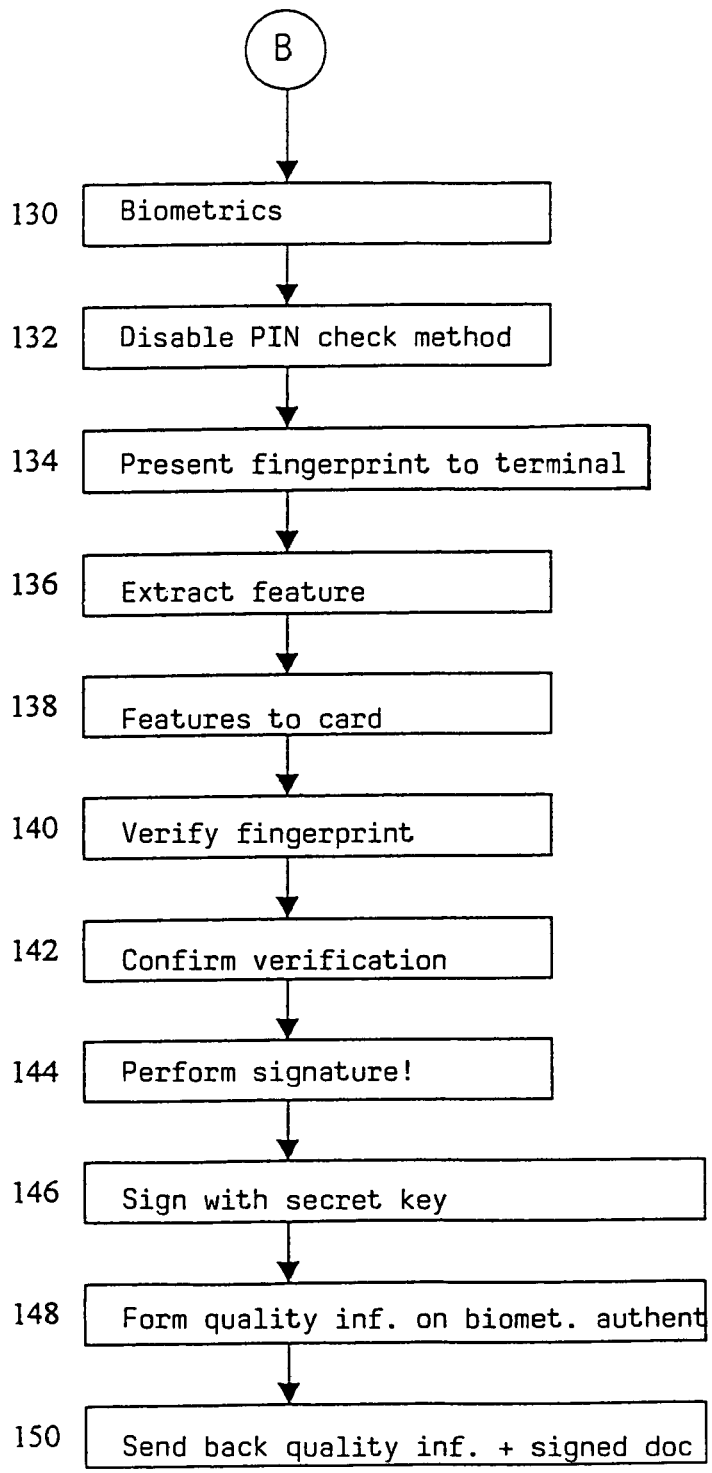

Hereinafter the effecting of a secure electronic transaction using the structure shown in FIG. 1 will be described with reference to FIGS. 2 and 3. The security-establishing operation will be the signing of an electronic document 40.

The use is initiated by creation of an electronic document 40 in the background system 10 or in the terminal 14, step 100. As a rule, said creation is preceded by an initiation dialog between a user 30 and the background system 10 via the terminal 14. At the latest when an electronic document 40 is present in the terminal 14, this causes the start of the signature application, step 102. This start can be caused automatically by the terminal 14 or the background system 10, or initiated by the user 30 after the terminal 14 has asked him to do so by means of a suitable display on the display device 16.

After the signature application has been started, the user 30 presents a suitable portable data carrier 20 to the terminal 40, step 104. The portable data carrier 20 will hereinafter be taken to have the form of a contact-type chip card. Further, it will hereinafter be assumed that the chip card 20 supports two authentication methods, namely a PIN check as a knowledge-based, inherently low-quality method, and a fingerprint check as a biometric, inherently higher-quality method.

When the terminal 14 has recognized the presence of a chip card 20, it first performs mutual authentication therewith, step 106, whereby the chip card 20 first proves its authenticity to the terminal 14 and then the terminal 14 to the chip card 20.

If authentication is successful, terminal 14 and chip card 20 negotiate dynamic session keys to permit further communication to be conducted securely in the so-called secure messaging mode, step 108. For details on the concept of secure messaging and dynamic session keys, reference is again made to the "Chip card manual".

Then, authentication of the user 30 vis-à-vis the chip card 20 is effected. First the terminal 14 checks how authentication is to be effected—knowledge-based, i.e. by input of a PIN, or biometrically, i.e. by presentation of a fingerprint, step 110. Specification of an authentication method can be effected automatically by the terminal 14 on the basis of information transmitted with the electronic document 40, but it can also be presented to the user 30 as a decision request via the display device 16. In the latter case the user 30 makes a decision by means of the input means 18.

If authentication of the user 30 is to be knowledge-based, i.e. effected by input of a PIN, the chip card 20 disables the further possible authentication methods, i.e. the fingerprint check, step 112, and asks the user 30 via the display device 16 to enter his PIN via the input means 18.

The user 30 thereupon enters the PIN via the input means 18 and the terminal 14 passes it on directly or in modified form via the interface 19, 22 to the chip card 20, step 114. Transmission of the PIN, or the information derived therefrom, and subsequent communication with the chip card is additionally secured using the negotiated session keys. The total communication between terminal 14 and chip card 20 is expediently effected in the secure messaging mode.

The card checks the transmitted PIN and confirms correctness to the terminal 14 in the no-error case, or terminates the procedure if the PIN was checked as false, step 116.

If the no-error case is given, the terminal 14 causes the chip card 20 by corresponding instructions to perform the security-establishing operation, i.e. the digital signature, and transmits the electronic document 40 to be signed to the chip card 20, step 118.

The chip card 20 signs the supplied electronic document 40 with the secret key stored in the storage means 22, step 120, and sends the electronic signature 40 back to the terminal 14, step 122, which uses it to continue the initiated electronic transaction.

If the check in step 110 shows that authentication of the user 30 is not to be knowledge-based but biometric, the terminal 14 initiates authentication against presentation of a biometric feature and makes a corresponding report to the chip card 20, step 130. The chip card 20 thereupon disables the further authentication methods not used, i.e. the knowledge-based PIN check, step 132.

Subsequently the user 30 presents to the terminal 14 a biometric feature according to the authentication method used, i.e. a fingerprint, step 134. The request to present the fingerprint is preferably effected by a corresponding display on the display device 16 of the terminal 14. The fingerprint is detected by the sensor 15 provided on the terminal 14.

The detected biometric feature, i.e. the fingerprint of the user 30, is subjected by the terminal 14 to pre-processing in which it extracts certain identifying features from the signal obtained on the sensor 15, step 136. If a fingerprint is used, primary features of the "Henry classification method" are determined, for example, as described in the "Chip card manual".

The extracted features are transmitted by the terminal 14 via the interface 19, 22 to the portable data carrier 20, step 138.

When the data carrier receives them it performs a verification of the transmitted extracted features, step 140. The integrated circuit 24 thereby compares the received extracted features with the reference features stored in the storage means and checks whether a sufficient match is present. If this is the case, the portable data carrier 20 confirms to the terminal 14 the successful verification of the transmitted biometric feature, step 142. Further, the portable data carrier 20 switches itself ready to execute the intended security-establishing operation, i.e. perform a digital signature.

After receiving the confirmation of successful verification of authentication, the terminal 14 causes the data carrier 20 by corresponding instructions to perform the digital signature, step 144. Together with the instructions the terminal 14 transmits to the portable data carrier 20 the electronic document 40 to be signed, or at least parts thereof.

The integrated circuit 24 of the portable data carrier 20 thereupon performs the operations required for creating a digital signature, step 146. It typically forms a hash value over the received part of the electronic document 40 and encrypts it with a secret key, stored in the storage means 26, of an asymmetrical key pair consisting of a secret key and public key.

Furthermore, the integrated circuit 24 forms quality information, step 148, which acknowledges that authentication of the user 30 was done using a biometric feature. Said quality information is thereupon joined firmly with the created digital signature to form a security message; expediently within the secure messaging mechanism using the previously negotiated session keys.

The thus formed security message consisting of digital signature and quality information is sent by the portable data carrier 20 back to the terminal 14, step 150. From here the transmitted security message is passed on within the effected secure electronic transaction to the recipient involved in the transaction, e.g. a background system 10.

In addition to the security-establishing operation performed by the portable data carrier 20, the recipient of the security message at the same time receives through the quality information contained therein a statement on the quality of the performed authentication of the user 30.

In the above-described example, quality information was created only upon use of a biometric authentication method, not upon use of a knowledge-based method. Thus, the lack of quality information already signals the use of a lower-quality method. However, it can of course be provided that quality information is always formed, i.e. regardless of whether a knowledge-based or biometric method was chosen for authentication.

While retaining the basic idea of attaching quality information about the quality of the previously performed user authentication to the result of a security-establishing operation executed by a portable data carrier, the above-described concept allows further embodiments and variations. This applies to the design of the system used in effecting a transaction, which can comprise more components and components of a different type. The described procedure can also comprise further steps, e.g. intermediate steps.

The invention claimed is:

1. A method for effecting a secure electronic transaction on a terminal using a portable data carrier arranged to perform different quality user authentication methods, wherein the portable data carrier performs a user authentication using one of said different user authentication methods, the portable data carrier confirms the proof of authentication to the terminal, and the portable data carrier then performs a security-establishing operation within the electronic transaction, comprising the steps of creating authentication quality information by the portable data carrier about said user authentication method used and attaching said authentication quality information to the result of the security-establishing operation, wherein the difference in quality of said user authentication methods varies between an inherently relatively lower quality and an inherently relatively higher quality from a security perspective.

2. The method according to claim 1, wherein the security-establishing operation performed by the portable data carrier comprises creating a digital signature.

3. The method according to claim 1, wherein the authentication of the user is performed by presentation of a biometric feature.

4. The method according to claim 3, wherein the authentication of the user is performed by presentation of a physiological or behavior-based feature characteristic of a user.

5. The method according to claim 1, wherein the authentication of the user is performed by proof of knowledge of a secret.

6. The method according to claim 1, wherein at least two different authentication methods of different quality are offered for authentication of the user.

7. The method according to claim 6, wherein the particular authentication methods not used are disabled.

8. The method according to claim 6, wherein no quality information is produced for an authentication method.

9. The method according to claim 1, wherein a user is asked to select an authentication method.

10. A portable data carrier for performing a security-establishing operation within a secure electronic transaction and arranged to perform different quality user authentication methods, wherein the difference in quality of said user authentication methods varies between an inherently relatively lower quality and an inherently relatively higher quality from a security perspective, comprising: the portable data carrier is arranged to perform a user authentication using one of said implemented user authentication methods and the portable data carrier is arranged to confirm the authentication to a terminal, and wherein the data carrier is arranged to create quality information about said user authentication method used and to attach such quality information to the result of the security establishing operation.

11. The data carrier according to claim 10, wherein the portable data carrier is set up to create a digital signature.

12. The data carrier according to claim 10, wherein the data carrier supports at least two qualitatively different authentication methods.

13. A terminal for use in connection with a portable data carrier, said terminal including a device arranged to cause a user to select one of at least two possible different quality authentication methods, wherein the portable data carrier is arranged to perform a user authentication using one of the at least two possible different quality authentication methods and to confirm the authentication to the terminal, and the data carrier is arranged to create quality information about the authentication method used and to attach such quality information to the result of a security establishing operation, the difference in quality of said authentication methods varies between an inherently relatively lower quality and an inherently relatively higher quality from a security perspective.

* * * * *